Oct. 11, 1927.  
C. E. JOHNSON  
1,644,883  
FLEXIBLE CLOSING FIXTURE FOR PISTON RINGS  
Filed July 27, 1925  
3 Sheets-Sheet 1
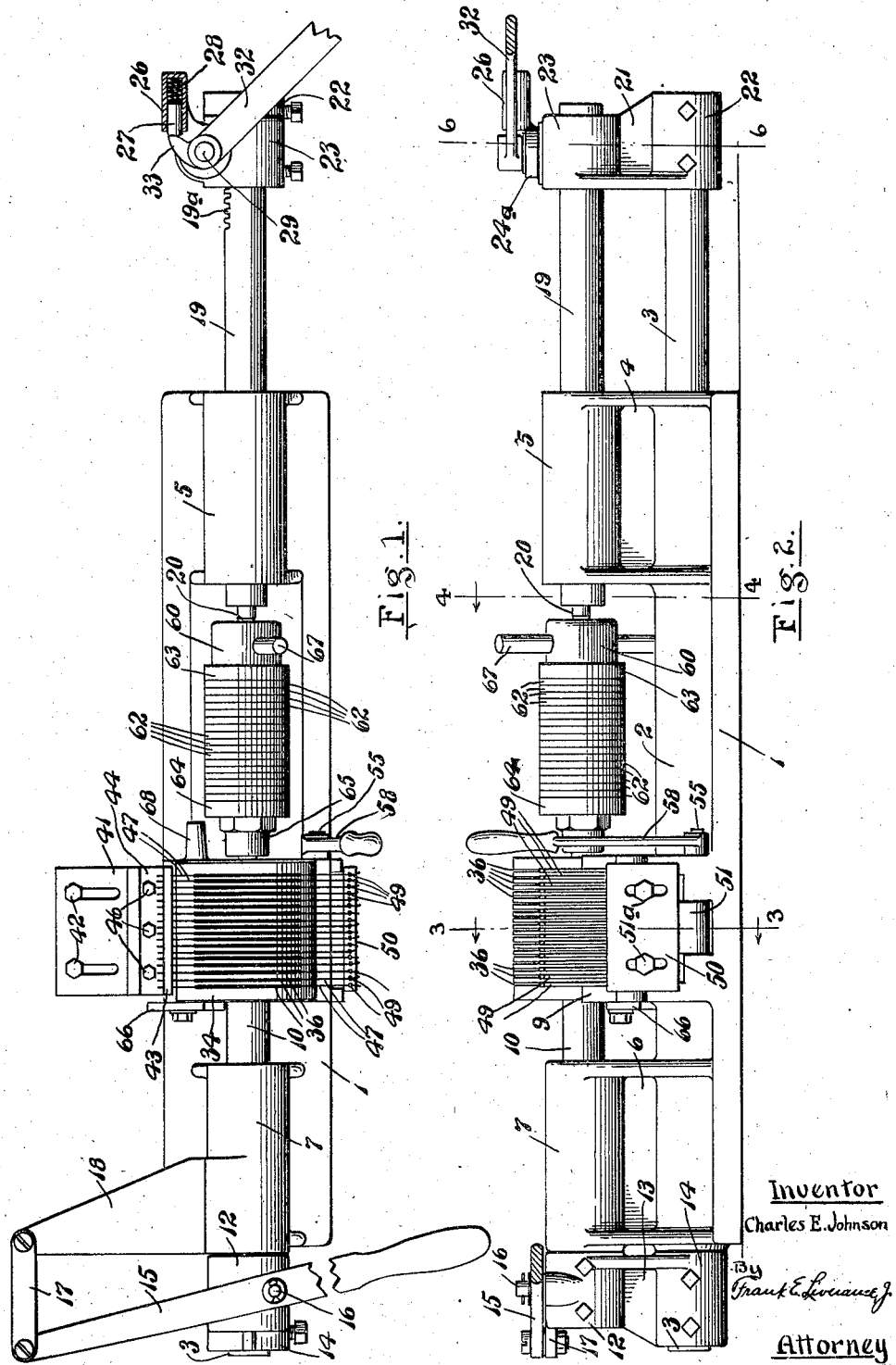
Inventor  
Charles E. Johnson  
By  
Frank E. Leveaux Jr.  
Attorney Oct. 11, 1927.

C. E. JOHNSON 1,644,883

FLEXIBLE CLOSING FIXTURE FOR PISTON RINGS

Filed July 27, 1925     3 Sheets-Sheet 2

Inventor
Charles E. Johnson
By
Frank E. Liverance Jr.
Attorney

Oct. 11, 1927.

C. E. JOHNSON 1,644,883

FLEXIBLE CLOSING FIXTURE FOR PISTON RINGS

Filed July 27, 1925   3 Sheets-Sheet 3

Inventor
Charles E. Johnson
By Frank E. Liverance Jr.
Attorney

Patented Oct. 11, 1927.

1,644,883

UNITED STATES PATENT OFFICE.

CHARLES E. JOHNSON, OF MUSKEGON, MICHIGAN, ASSIGNOR TO THE PISTON RING COMPANY, OF MUSKEGON, MICHIGAN, A CORPORATION OF MICHIGAN.

FLEXIBLE CLOSING FIXTURE FOR PISTON RINGS.

Application filed July 27, 1925. Serial No. 46,268.

This invention relates to a flexible closing fixture for piston rings used in the process of manufacturing rings each of which is made from an individual casting. It is to be understood, however, that this fixture is adapted for use irrespective of how the ring castings are made in the first instance, so long as they are separate from each other, have had a parting or gap made therein in a side of each ring, and are to be compressed together into substantially circular form for the finishing operations on the outer curved surfaces of the rings, at the stage of operations where the invention I have made is used.

The present invention is directed to a particularly effective fixture in which the individual rings may be placed upon a mandrel and thereafter subjected to outside pressure which will close the rings at the partings thereof, whereupon the rings may be clamped in such compressed position against outward opening movement. A plurality of the rings thus closed at their partings and clamped together on a mandrel may then be subjected to lathe or grinding operations to finish the outer curved surfaces of the ring to a desired size. And my invention has for its primary object and purpose the production of a fixture of this character whereby the rings may be very quickly and expeditiously pressed together at their partings, the partings closed when located on the mandrel, and the rings clamped together on the mandrel while held in such compressed or closed position.

For an understanding of the invention for the effective attainment of the ends stated reference may be had to the following description taken in connection with the accompanying drawings, in which, Fig. 1 is a plan view of the fixture, the rings being shown on a mandrel prior to their being closed together at the partings thereof;

Fig. 2 is a front elevation of the structure shown in Fig. 1;

Like reference characters refer to like parts in the different figures of the drawings.

Figure 3:
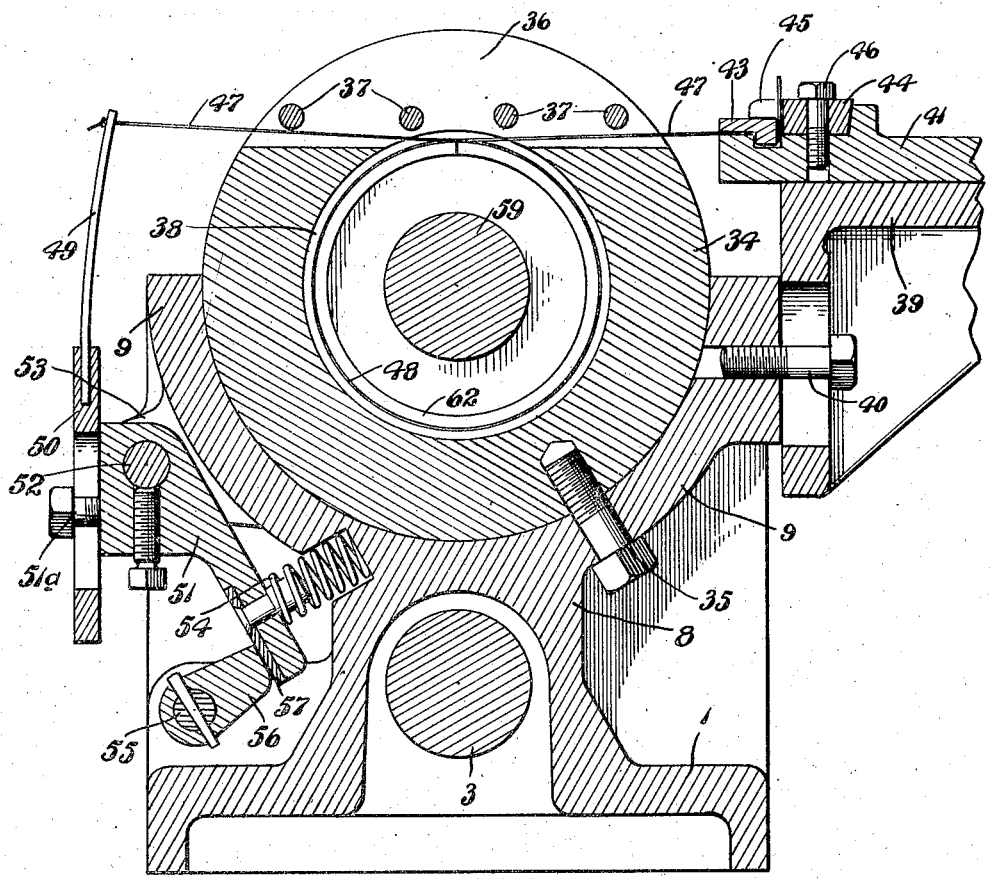
Fig. 3 is an enlarged vertical transverse section substantially on the plane of line 3—3 of Fig. 2.
Figure 4:
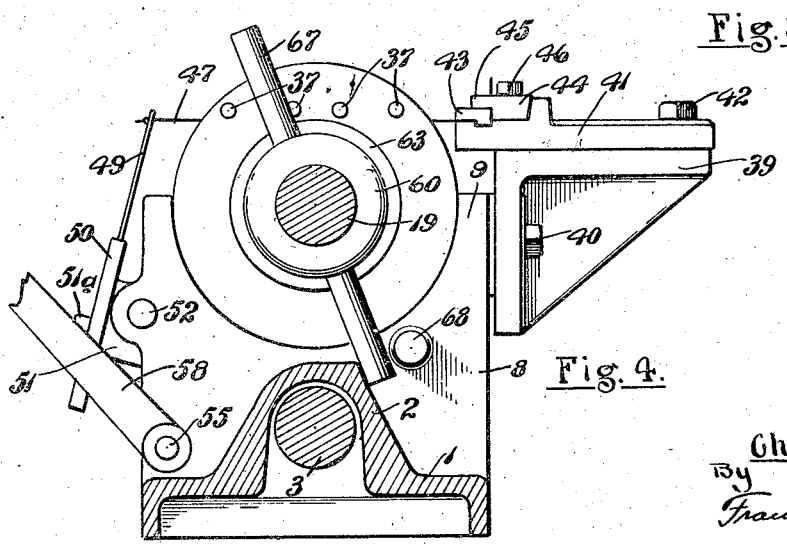
Fig. 4 is a like section substantially on the plane of line 4—4 of Fig. 2.

In the construction of the fixture, an elongated base 1 is provided formed with a substantially centrally located and upwardly projecting inverted trough 2 through which a rod 3 passes longitudinally, at each end extending beyond the end of the base 1, said rod being mounted for longitudinal sliding movement on the base. At one end of the base a post 4 is integrally cast extending upwardly and at its upper end being formed with a sleeve 5, the axis of which is parallel to the longitudinal center line of the base. At the opposite end of the base a similar post 6 extends upwardly terminating in a sleeve 7 in alignment with the sleeve 5 but spaced therefrom. Between the posts 4 and 6 and closer to the post 6 than the post 4 the base is formed with an upwardly extending projection 8 which is enlarged and widened and formed into a relatively large concave trough 9 which also lies longitudinally of the base as shown.

Figure 5:
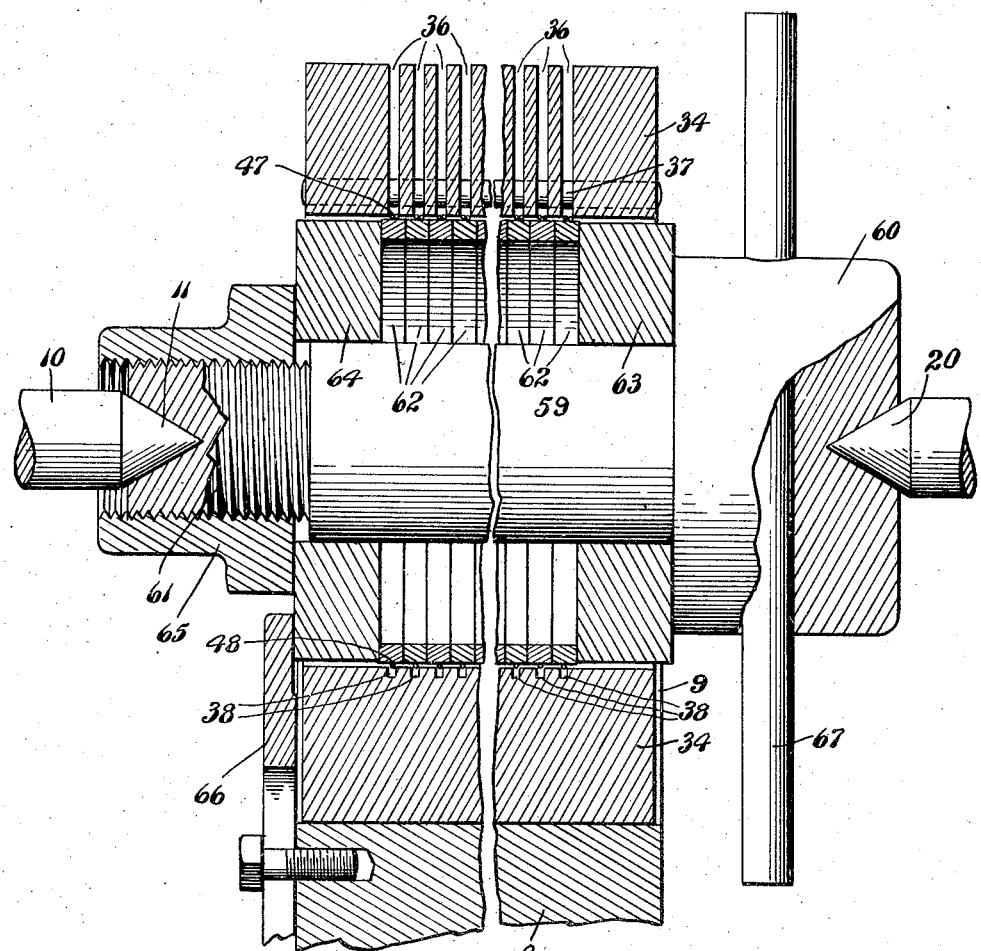
Fig. 5 is a fragmentary enlarged vertical longitudinal section through the ring compressing means shown in cross section in Fig. 3.

A rod or spindle 10 passes through the sleeve 7 and is slidably mounted therein, at its inner end being formed with a conical center 11 (see Fig. 5). A sleeve or collar 12 is permanently secured to the outer end of the rod 10 from which a web 13 extends downwardly, at its lower end being formed with a sleeve or collar 14 which is permanently secured to the adjacent end of the rod 3 directly below. A hand operated lever 15 is pivotally mounted between its ends at 16 at the upper side of the sleeve or collar 12 and has a link connection through the link 17 with the outer end of an arm 18 projecting rearwardly from the sleeve 7, as best shown in Fig. 1. It is evident that by moving the lever 15 from the position shown in Fig. 1 to the left the rod 10 may be moved outwardly through the sleeve 7 and simultaneously therewith the rod 3 will move in the same direction.

Figure 6:
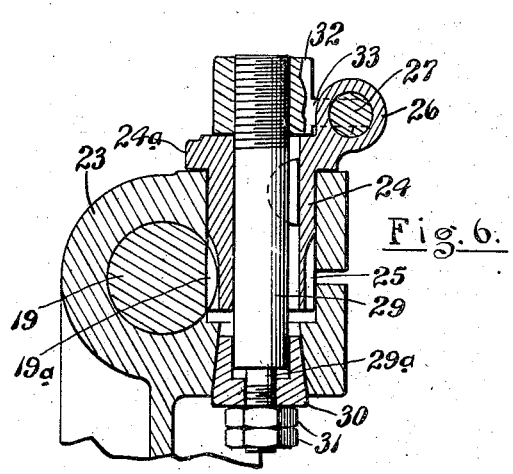
Fig. 6 is a fragmentary enlarged vertical transverse section on the plane of line 6—6 of Fig. 2.

A rod or spindle 19 is slidably mounted through the sleeve 5 and at its inner end terminates in a conical center 20. The end of the rod 3 opposite from that carrying the sleeve or collar 14 is equipped with a similar sleeve or collar 22, connected by an integral web 21 with an upper split collar 23 through which the outer end of the rod 19 passes. Said rod 19 at its rear side is formed with rack teeth 19$^a$ the purpose of which will later appear. A sleeve 24 formed at its lower end with pinion teeth 25 is located vertically and has a rotatable mounting in a vertical opening made in the upper side of the split collar 23, the pinion being in mesh with the rack 19$^a$ previously described. The upper end of the sleeve 24 is enlarged in diameter forming an annular flange 24$^a$ which bears against the upper side of the collar 23. Integral with said flange and to one side thereof a housing 26 closed at one end is formed in which a short plunger 27 is mounted between which and the closed end of the housing 26 a coiled spring 28 is located. A short shaft 29 extends downwardly through the pinion sleeve 24 and is keyed thereto, its lower end being received in the upper end of a substantially cup-shape member 30 having upwardly tapered sides fitting into a tapered seat therefor formed in the lower side of said collar 23. The shaft 29 is formed with a reduced extension 29$^a$ which passes through the member 30 and is threaded at its lower end to receive the nuts 31 which bear against the member 30 as shown in Fig. 6. At the upper end of the shaft 29 a hand operated lever 32 is located, the upper end of the shaft 29 being threaded through said lever adjacent its end. A finger 33 extends from lever 32 in position so as to come against the projecting end of the plunger 27 when said lever is turned in a clockwise direction (see Fig. 1).

Within the concave trough member 9 a heavy cylinder 34 of metal is located, being rigidly yet detachably held in place by the set screw 35 (see Fig. 3). This cylinder 34 has a longitudinal cylindrical opening lengthwise therethrough and at its upper side is transversely slotted making the slots 36 which extend to said cylindrical opening. A number of small rods 37 pass through the member 34 at a point a short distance above the bottoms of the slots 36. The cylindrical member 34 on its inner side is grooved with a plurality of spaced apart annular grooves 38 one for each of the slots 36 and in alinement therewith.

At the rear side of the trough member 9 a bracket 39 is mounted and may be adjusted vertically to a limited extent and held in any position to which it may be adjusted by the set screw 40 which passes through a vertical slot in the bracket. A metal plate 41 having a width nearly equal to the length of the cylindrical member 34 is adjustably mounted at the upper side of the bracket 39 being secured in place by set screws 42. At the edge of the plate 41 nearest the cylindrical member 34 a clamping bar 43 is located which is held in clamping position by a bar 44 located back of the bar 43 and having fingers 45 which extend over said clamping bar 43, set screws 46 passing through the bar 44 into the plate 41. The ends of wires 47 passed under said clamping bar 43 are thus clamped and held securely in place at one end.

The wires 47 one for each of the slots 36 extend into said slots and thence downwardly and around the grooves 38 making the loops 48 and are then extended outwardly through the slots 36 and attached each at its front end to the upper end of spring fingers 49 which, at their lower ends, are all permanently secured and extend upwardly from a plate 50, securely but adjustably connected to a rocker member 51 by means of the set screws 51$^a$ passing through vertical slots in the plate 50. The rocker member 51 is secured to a shaft 52 which in turn is rotatably mounted on and between ears 53 extending forwardly from the trough-shape member 9. The inner end of the rocker member 51 extends downwardly and inwardly and is normally acted upon by a coiled spring 54 disposed between said member 51 and the trough member 9 (see Fig. 3). The tendency of the spring, it is evident, is to turn the fingers 49 to the rear toward the cylindrical member 34 whereupon any tension on the wires 47 is relieved and said wires, by reason of the spring material of which they are made, will tend to expand the loops 48 until the same come to the bottoms of the grooves 38.

Below the shaft 52 a second shaft 55 is rotatably mounted on the base 1 to turn on a horizontal axis, it having a cam finger 56 projecting therefrom which is adapted in one position to bear against a wearing plate 57 of hardened material fastened to the inner end of the rocker member 51. A handle 58 is secured to the shaft 55 and by operating the same so as to bring the cam finger 56 to the position shown in Fig. 3, spring 54 may be compressed and the rocker member 51 rocked about the axis of shaft 52, thereby moving the fingers 49 outwardly, this causing a contraction of the wire loops 48. It is to be understood that the cylindrical member 34 may be varied with respect to the diameters of the openings therethrough for different sizes of piston rings, the outer diameter of said member 34 remaining constant so as to fit the trough member 9.

With a fixture of the construction described, mandrels on which unfinished piston rings are mounted may be used. These mandrels 59 at one end are provided with enlarged heads 60 and at the opposite end with a threaded end portion 61 of reduced diameter. A heavy collar 63 is placed against the head 60, then a plurality of piston rings 62 which have been finished on their opposite flat sides and have had their partings cut therein are placed over the mandrel 59, after which a second collar 64 similar to the collar 63 is placed over the mandrel and the whole bound together by a binding nut 65 which threads onto the threaded projecting end 61 of the mandrel against the collar 64. The head 60 at its end is formed with a conical recess to receive the center 20, while the part 61 of the mandrel is likewise formed with a conical recess in its end to receive the center 11. With the rods 10 and 3 in the positions shown in Figs. 1 and 2 the mandrel is placed between the centers 11 and 20, that is, center 11 is placed in the recess in the part 61 of the mandrel and the rod 19 is operated to move the center 20 into the recess in the head 60.

In this operation the lever 32 at the beginning of the operation is unscrewed sufficiently from the shaft 29 that the binding member 30 is relatively loose in the socket in which it is located. The turning of the lever 32 in a clockwise direction brings finger 33 against the plunger 27 compressing spring 28, whereupon the pinion sleeve 24 turns and moves the rod 19 freely inward until the center 20 engages in the recess in the head 60 of the mandrel. Further movement of the lever 32, as it cannot move the rod 19 further inward, causes said lever to turn with respect to the shaft 29 threading itself thereon and bringing the clamping member 30 upwardly into the socket and tightly binding the split collar 23 to the rod 19 with the mandrel held firmly between the centers at the ends of the two rods 10 and 19.

When so positioned the fixture may then be subjected to the operation of the lever 15, causing rods 10 and 3 to move to the left from the position shown in Figs. 1 and 2, this carrying the rod 19 with them inasmuch as it is now securely connected with the rod 3 at its outer end. As this occurs the mandrel with the rings 62 thereon are carried into the opening in the member 34, and as the member 51 is released from the action of the cam finger 56 the loops 48 are expanded and received into the grooves 38 permitting the free passage of rings into the central cylindrical opening of the member 34. This movement continues until the collar 64 is stopped by engagement against the stop plate 66 shown in Fig. 5 as attached at one end of the trough member 9 and extending partly across the concave recess therein. When so located within the member 34 a rod 67 which passes through the head 60 is positioned between the upraised portion 2 on the base 1 and a pin or lug 68 extending from the part 8. This is to hold the mandrel against any tendency to rotate.

The rings 62 are disposed within the member 34 one over each groove 38 and under each slot 36, a loop of wire 48 being around each ring. The nut 65 is loosened so as to permit free compression of the rings and closing of the partings or gaps therein, whereupon handle 58 is operated to turn the rocker member 51 and move the spring fingers 49 outwardly, this drawing the loops tightly against the rings and compressing each ring until the gap or parting therein is closed. The nut 65 is then tightened to clamp the rings and the collars 63 and 64 tightly together, the spring loops 48 released by reversely operating the handle 58, lever 15 operated to move the mandrel with the rings thereon outwardly to the position shown in Figs. 1 and 2, and lever 32 is then operated in a counter-clockwise direction until the rod 19 is moved outwardly sufficient to free the mandrel, which with its rings may be removed and carried to a suitable lathe or grinding machine wherein all of the rings may be finished to perfectly circular form, this being approximately the form which the rings take when they are closed at the partings or gaps therein.

This fixture is very practical and effective for the purposes for which it is designed and with it the rings may be properly located on the mandrel and clamped in position. The wires 47 are of a high grade spring material such as piano wire or the like and the spring fingers 49 yield sufficiently when required to compensate for any discrepancies or inaccuracies in the relatively rough and unfinished outer curved surfaces of the rings. As previously stated the members 34 may have cylindrical openings longitudinally therethrough of different diameters and with grooves and slots differently spaced for the different diameters and widths of the piston rings made. The construction shown is illustrative of a practical and operative form of the fixture but the invention is not to be restricted thereto as to specific detail and is to be considered as comprehensive of all forms or variations of structure which come within the scope of the appended claims defining the invention.

I claim:

1. In a device of the character described, a member having a cylindrical opening therethrough adapted to receive a plurality of piston rings located side by side, a plurality of individual contractible means located within said opening one for each piston ring through which the piston rings pass when placed within the member, and a single means for simultaneously contracting all of said contractible means to thereby simultaneously close all of the rings at the partings therein, substantially as described.

2. In a device of the character described, a member having a cylindrical opening therethrough, said member having a slot in one side extending to said opening, and the walls of said opening being grooved in the same plane with said slot, a wire extending into said slot and thence to and around said groove and thence outward through the slot, whereby a loop is formed into which a piston ring parted at one side may be passed, and means for exerting tension on said wire to contract the loop and thereby close a ring within said loop at the parting therein, substantially as described.

3. In a device of the character described, a member having a cylindrical opening therethrough and formed with a plurality of spaced-apart slots in one side extending to said opening, said member at its inner side being formed with a plurality of grooves in the same planes with said slots, a plurality of wires, one for each slot and groove, extending one into each slot thence into and around said groove and thence outward through the slot, whereby a plurality of loops are formed normally seating in the grooves and permitting a plurality of piston rings parted at one side to be inserted in the opening in said member with a loop around each piston ring, and means for simultaneously exerting tension on all of the wires to contract said loops and thereby simultaneously close all of the rings at the partings therein.

4. In a device of the character described, a member having a cylindrical opening therein and formed with a plurality of spaced-apart slots at one side cut through to said opening, said member at its inner side being formed with a plurality of grooves located one in the plane of each slot, a supporting fixture located at one side of the member, a plurality of wires attached to said fixture one for each slot extending therefrom into their respective slots thence into and around the grooves and thence outward at the opposite side of said first member, a tensioning member, and a plurality of fingers extending upwardly from said tensioning member to each of which the end of a wire is secured, whereby when said tensioning member is moved in one direction the wire loops are contracted, substantially as and for the purposes described.

5. A construction containing the elements in combination defined in claim 4, combined with a plurality of rods extending lengthwise of said first-mentioned member a short distance from the bottoms and transversely of said slots.

6. A construction containing the elements in combination defined in claim 4, combined with spring means acting on said tensioning member normally tending to move the same so as to carry the ends of said fingers inwardly toward said first-mentioned member, a rotatably mounted shaft, means for manually turning the same, and a cam fixed on said shaft to engage with the tensioning member and move the same against said spring to thereby move the fingers outward and contract said wire loops, substantially as described.

7. In a device of the class described, a support formed with a concave trough open at its upper side, a cylindrical member having a central cylindrical opening longitudinally therethrough located in said trough and secured thereto, said cylindrical member being formed in its upper side with a plurality of spaced-apart vertical slots cut inwardly to said opening, a plurality of wires formed into loops within the opening of said member and having their ends extending outwardly in opposite directions through said slots, one wire being used with each slot, means for fixedly securing one end of each of said wires to the support, and movable means mounted on the support to which the opposite ends of the wires are secured, whereby on operation of said movable means in one direction tension is exerted on the wires and the loops thereof contracted, substantially as described.

8. In a device of the class described, a support, a member carried thereby having a longitudinal cylindrical opening therethrough, said member being formed at one side with a plurality of spaced-apart slots cut through to said opening, a plurality of wires formed into loops within the opening in said member having their ends extending in opposite directions through said slots, there being one wire and loop for each slot, means for fixedly securing one end of each wire with respect to the support, and movably mounted means mounted on said support to which the opposite ends of the wires are connected, whereby on movement of said movably mounted means in one direction the loops are contracted and in the opposite direction are allowed to normally expand, substantially as described.

9. In a device of the character described, an elongated support formed at its upper side with a trough member, a member located within said trough and connected to the support, said member being formed with a horizontal central longitudinal cylindrical opening therethrough, and at its upper side being formed with a plurality of spaced-apart slots cut through to said opening, a bracket attached to said trough at one side thereof, clamping means carried by the bracket, a plurality of wires, one for each slot, secured at one end to said clamping means, extending therefrom to their respective slots, thence formed into loops within the opening in said member and thence extending outwardly through their respective slots in the opposite direction, a rocker member pivotally mounted to turn on a horizontal axis at the opposite side of said trough, a plate attached to the rocker member, spring fingers one for each wire extending upwardly from the plate to the upper end of each of which the end of a wire is secured, spring means normally turning the rocker member in the opposite direction to thereby contract the loops of said wires to smaller diameter, substantially as described.

10. A construction containing the elements in combination defined in claim 9, said manually operable means for operating the rocker member comprising a shaft mounted to turn about a horizontal axis and located below the pivotal axis of the rocker member, a handle attached to said shaft for manual turning thereof, and a cam finger attached to said shaft adapted to bear against the rocker member to move the same against said spring means, substantially as described.

11. A construction containing the elements in combination defined in claim 9, combined with a plurality of spaced-apart rods extending lengthwise of said first member a short distance above the bottoms and transversely of said slots.

12. In a device of the class described, an elongated support, a rod slidably mounted lengthwise of and at the lower portion of the support, additional rods slidably mounted one at each end of the support above the first rod, said rods at their inner ends terminating in centers between which a mandrel adapted to carry a plurality of piston rings may be located, a member having a central longitudinal cylindrical opening therethrough carried by said support between its ends, means connecting the lower rod to each of said additional rods, means for manually moving all of the rods longitudinally of the support whereby said mandrel with piston rings thereon may be carried into the opening of said member, a plurality of contractible devices located within the opening in said member one for each piston ring on the mandrel, and means for simultaneously contracting all of said contractible means to thereby simultaneously close all of the piston rings on said mandrel at the partings therein, substantially as described.

13. In a device of the class described, an elongated support, two rods slidably mounted in the upper portion of the support one at each end thereof, said rods at their inner ends being provided with centers between which a piston ring carrying mandrel may be located, a third rod extending lengthwise of and slidably mounted in the lower portion of said support having its ends extending beyond the ends of the support, means connecting one of said first-mentioned rods permanently with one end of the third rod, means for detachably connecting the other of said first-mentioned rods with the opposite end of the third rod, a member having a longitudinal cylindrical opening therethrough carried by said support between its ends, means for moving all of the rods simultaneously when the same are connected together longitudinally of the support to carry said mandrel and the piston rings mounted thereon into the opening in said member, and means within said member operable to close all of the piston rings carried on said mandrel at their partings when said rings are located within said member, substantially as described.

14. Means for simultaneously contracting a plurality of parted piston rings to close the partings thereof, comprising a plurality of wire loops one around each ring, and means for simultaneously contracting all of said loops.

15. Means for simultaneously contracting a plurality of parted piston rings, comprising a plurality of separate contractible members, each adapted to engage one piston ring, and a single means acting to simultaneously contract all of said members.

16. Means for simultaneously contracting a plurality of parted piston rings, comprising a plurality of separate contractible members, each adapted to engage one piston ring, a plurality of yieldable actuating members, one for each contractible member, and a single tensioning device acting simultaneously upon all of said actuating members to simultaneously contract all of said contractible members.

17. Means for simultaneously contracting a plurality of parted piston rings, comprising a plurality of looped members, each adapted to surround one piston ring, and a single means to simultaneously contract all of said looped members.

18. Means for simultaneously contracting a plurality of parted piston rings, comprising a plurality of looped flexible bands, each having one end fixed and each adapted to surround one piston ring, a yieldable member attached to the free end of each band, and a single actuating member connected to all of said yieldable members and acting to simultaneously and yieldably contract all of said looped members.

19. Means for simultaneously contracting a plurality of parted piston rings, comprising a plurality of flexible looped bands, each having one end fixed and each adapted to surround one piston ring, a single movable actuating member, and a plurality of spring fingers fixed to said actuating member, each spring finger being connected to the free end of one of said looped bands.

20. In a device of the class described, a plurality of separate contractible members, each adapted to engage one piston ring, a single means acting to simultaneously contract all of said contractible members, and means for clamping a plurality of piston rings together while contracted by said contractible members.

In testimony whereof I affix my signature.

CHARLES E. JOHNSON.